May 21, 1957     B. I. LARSSON ET AL     2,792,688
CONTROL SYSTEMS FOR THE AIMING OF GUNS
Filed Jan. 29, 1953     8 Sheets-Sheet 1

INVENTORS
BÖRJE INGVAR LARSSON
KURT MARTIN NORDFORS
BY
*Frederick E. Hane*
ATTORNEY

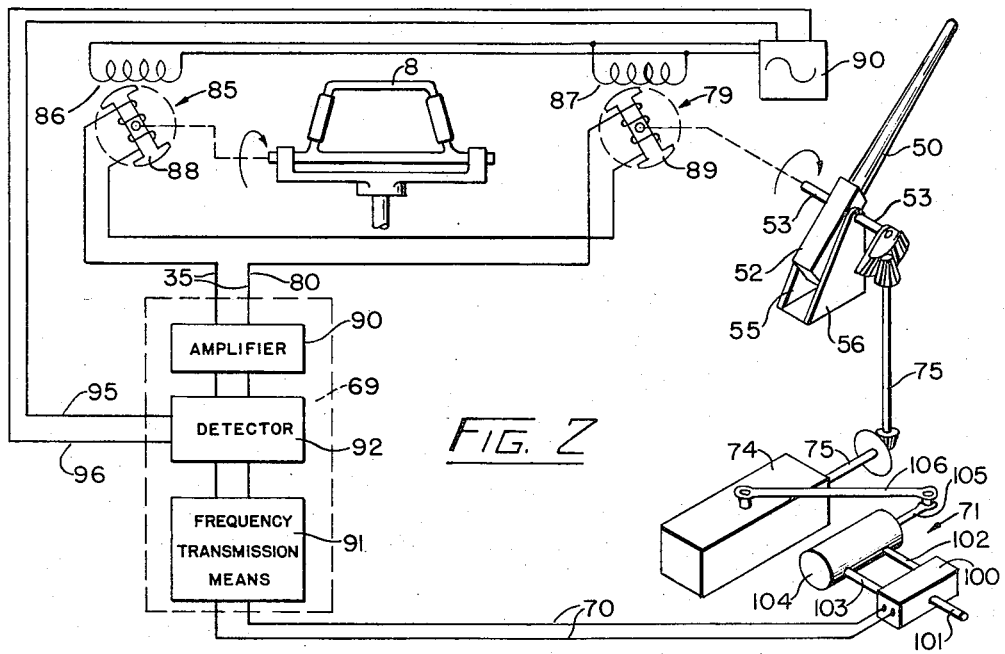

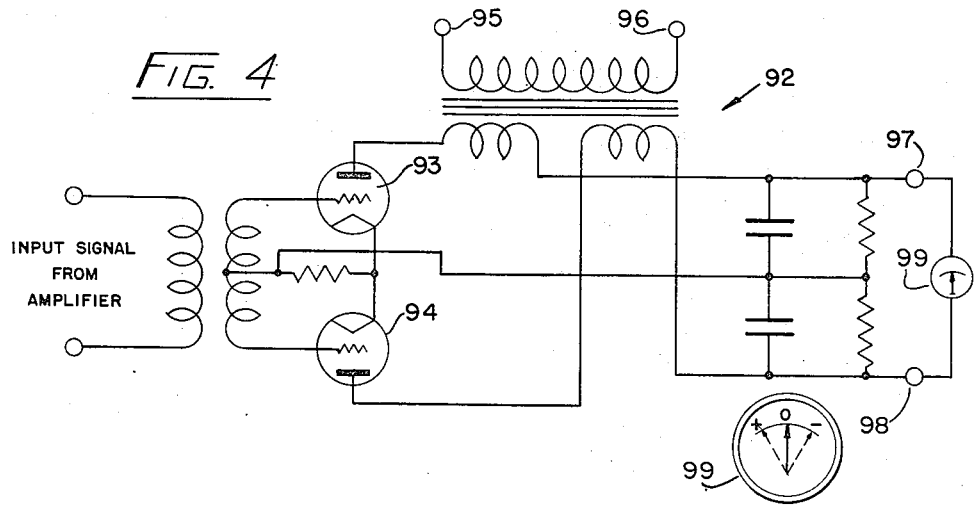
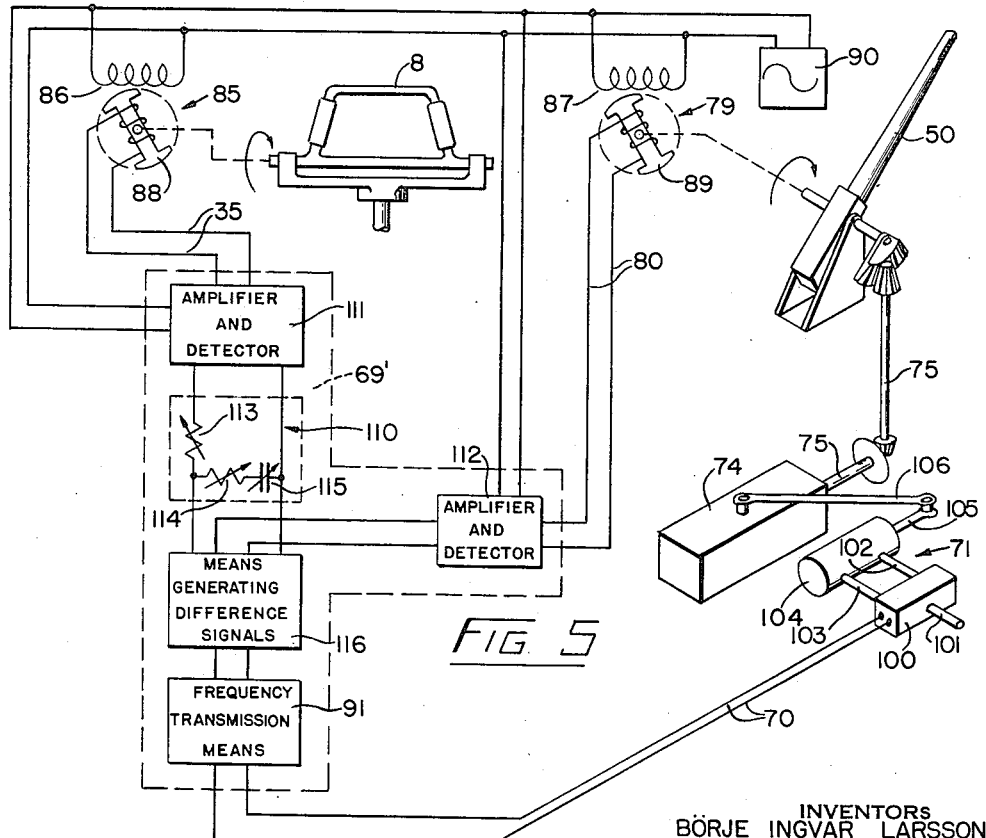

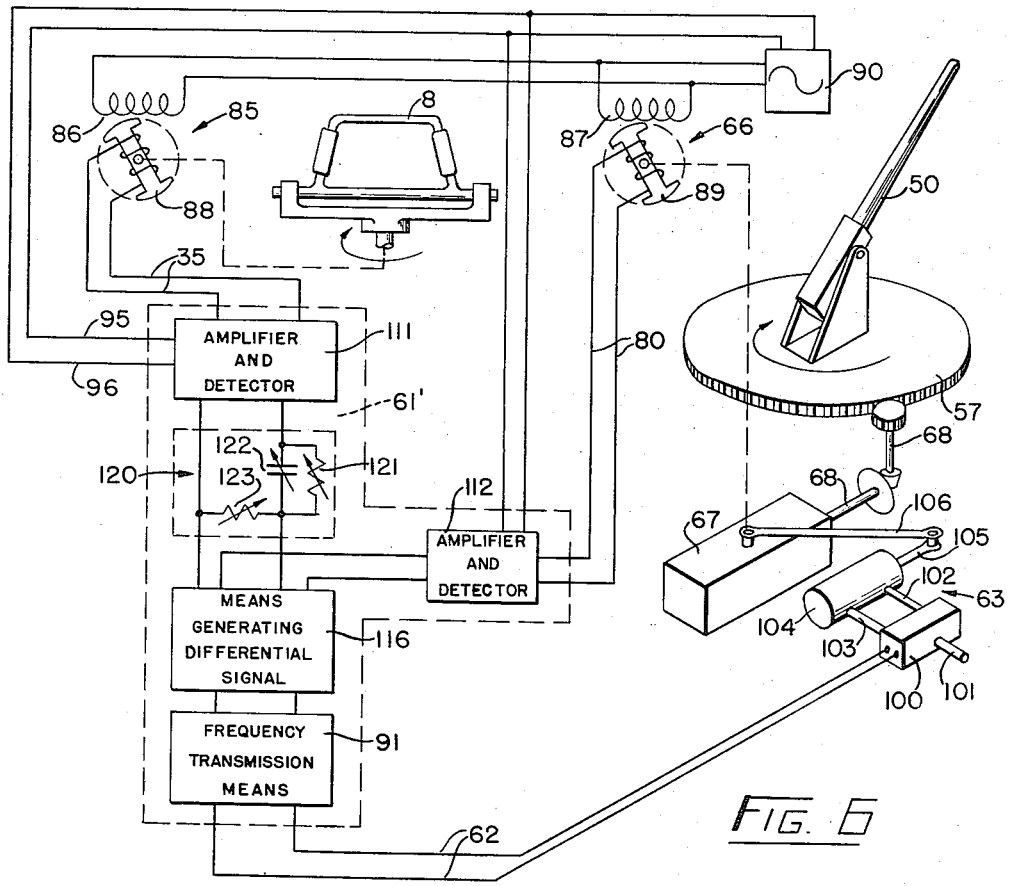
FIG. 6
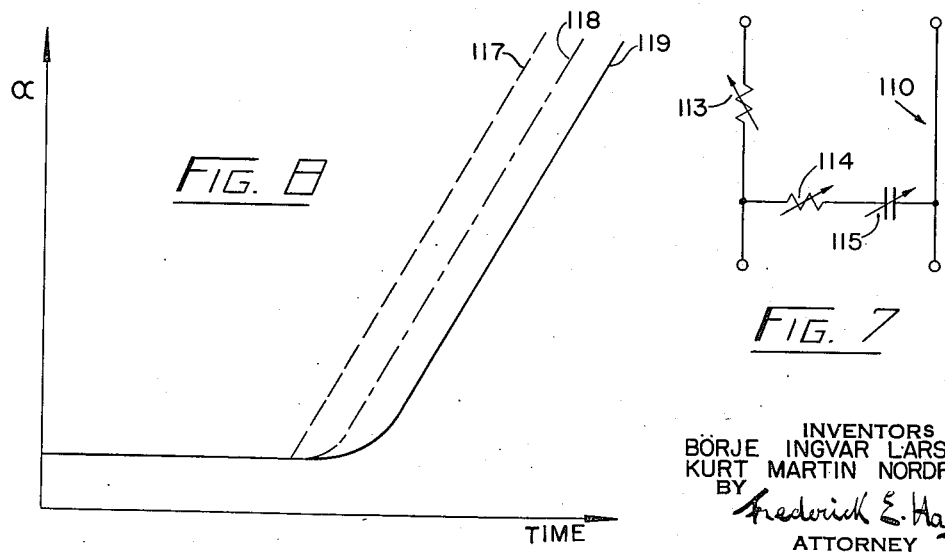
FIG. 8
FIG. 7
INVENTORS
BÖRJE INGVAR LARSSON
KURT MARTIN NORDFORS
BY
Frederick E. Hane
ATTORNEY May 21, 1957   B. I. LARSSON ET AL   2,792,688
CONTROL SYSTEMS FOR THE AIMING OF GUNS
Filed Jan. 29, 1953   8 Sheets-Sheet 5
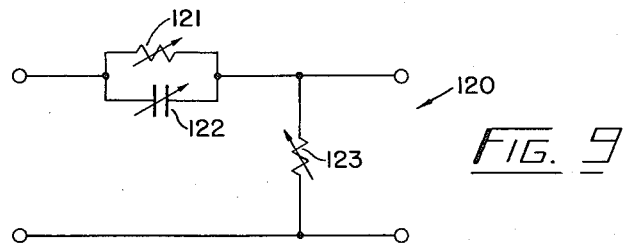
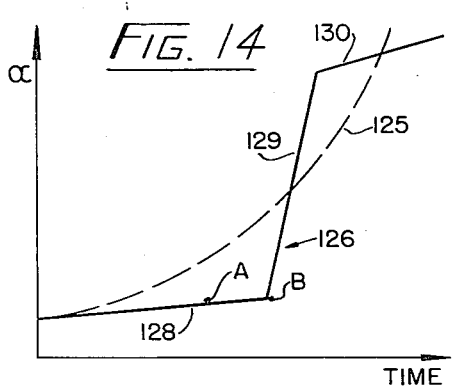
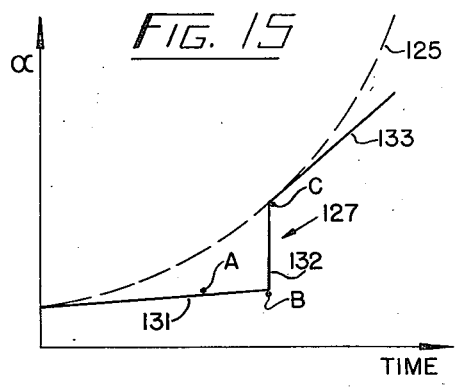
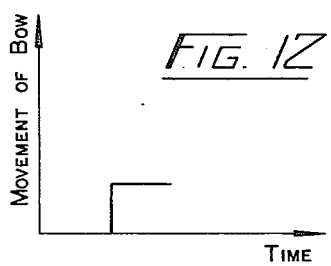
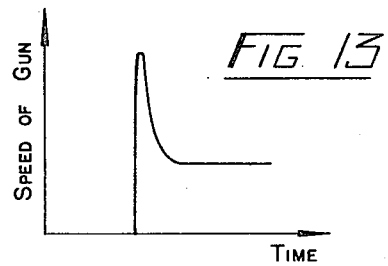
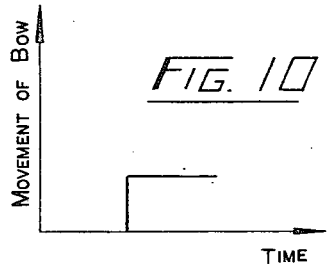
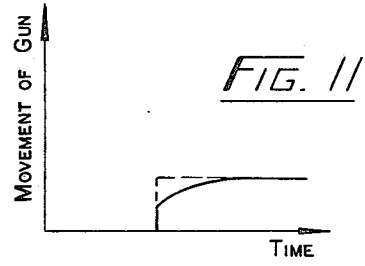
INVENTORS
BÖRJE INGVAR LARSSON
KURT MARTIN NORDFORS
BY
ATTORNEY

INVENTORS
BÖRJE INGVAR LARSSON
KURT MARTIN NORDFORS
ATTORNEY

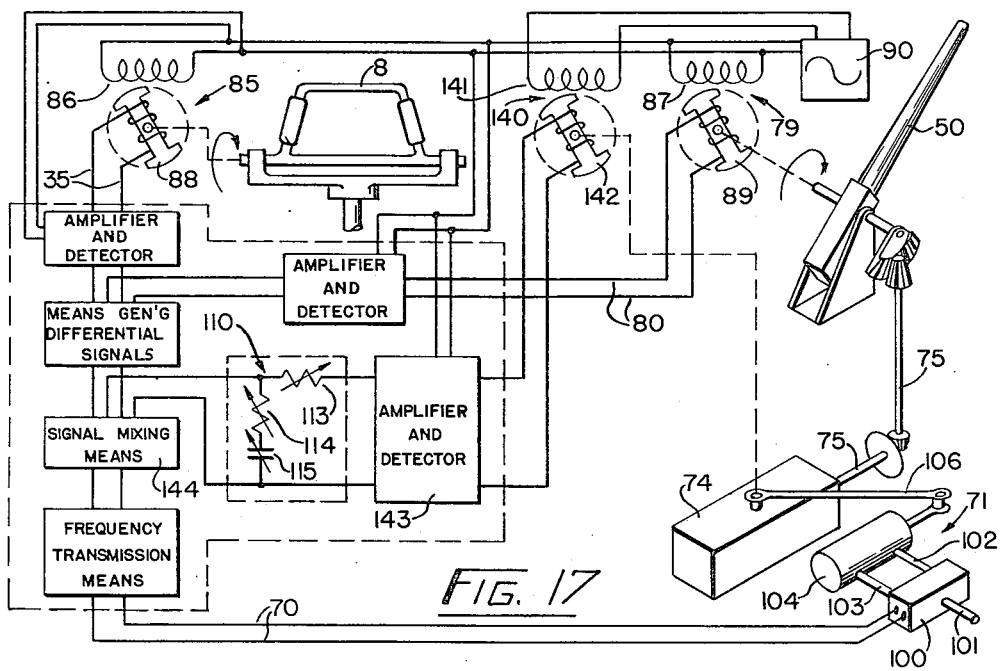
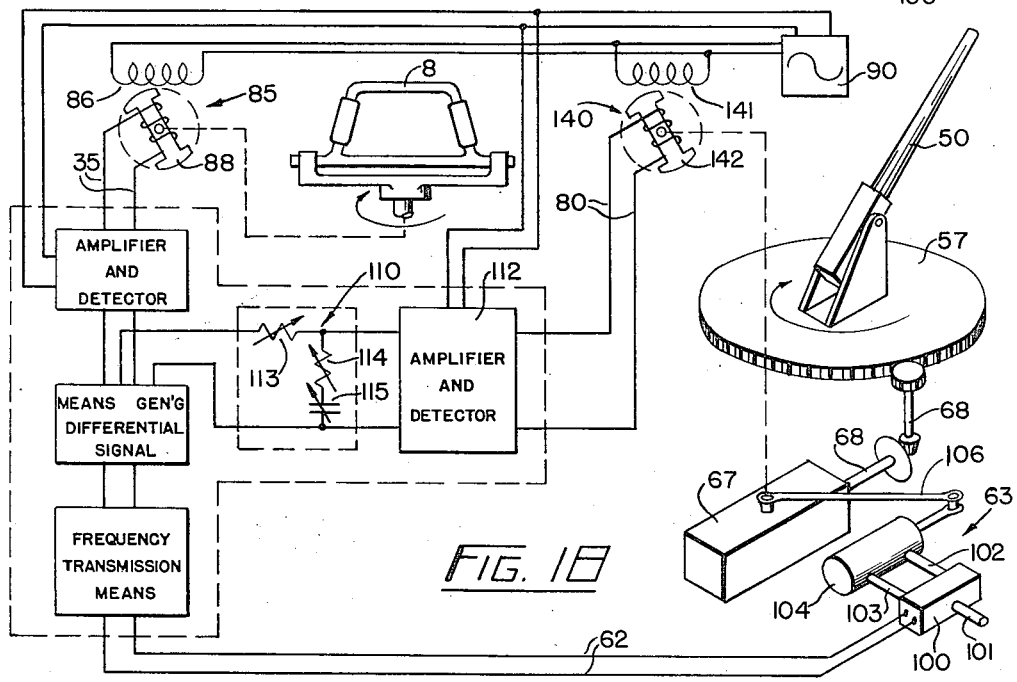

United States Patent Office 2,792,688
Patented May 21, 1957

2,792,688

CONTROL SYSTEMS FOR THE AIMING OF GUNS

Börje Ingvar Larsson, Lidingo, and Kurt Martin Nordfors, Kariskoga, Sweden, assignors to Aktiebolaget Bofors, Bofors, Sweden, a corporation of Sweden Application January 29, 1953, Serial No. 333,962

Claims priority, application Sweden January 27, 1950

16 Claims. (Cl. 60—97)

The present invention relates to control systems for aiming guns in a lateral or azimuth plane and in an elevational plane, particularly to systems of this type that are controlled by electric signals.

The application is a continuation in part of our copending application Ser. 207,950, filed on January 26, 1951, and now abandoned.

Guns equipped with electric control systems of the general type above referred to, are particularly suitable for aiming at and tracking a moving object. However systems of this type, as hitherto known, are not very satisfactory for the tracking of fast moving objects such as airplanes. Such fast moving objects require a higher accuracy and a faster following speed than hitherto obtainable and the mental reaction time of the layer or gun pointer of the gun crew must also be taken into consideration. One of the problems involved in the tracking of aircraft is that the vertical movement of aircraft relative to the gun emplacement is very fast in a lateral plane but not so fast in a perpendicular plane. Hence, the problems to be solved in connection with control of the lateral movement of the gun are different from the problems involved in the elevational control of the gun.

One of the objects of the present invention is to provide a control system for laterally and vertically aiming a gun, particularly an anti-aircraft gun, which permits the gun pointer to move the gun barrel closely and accurately along the ideal path that the gun barrel should travel when correctly following an aircraft or other moving target.

Another object of the invention is to provide a control system of the general type, above referred to, which automatically takes into consideration the mental reaction time of the gun pointer during a traversing operation and compensates for undesired movements caused by the mental reaction time during an elevation of the gun.

Another object of the invention is to provide a control system of the general type, above referred to, which is so arranged that the control means of the system, generally a control bow or a joystick, impart a rate of movement to the gun barrel in response to an azimuth adjustment of the control bow which is different from the rate of movement imparted to the gun barrel by an adjustment in elevational direction. Such arrangement affords the advantage that the gun pointer is capable of accurately following the more rapid lateral movement of the aircraft or other moving target.

A more specific object of the invention, allied with the next preceding one, is to provide control means for controlling the lateral rate of movement of the gun barrel so that the barrel moves at a different speed at different rotational positions of the control bow.

Other and further objects, features and advantages of the invention, will be pointed out hereinafter and set forth in the appended claims forming part of the application.

In the accompanying drawing several now preferred embodiments of the invention are shown by way of illustration and not by way of limitation.

In the drawing:

Fig. 2 is a circuit diagram of a control system according to the invention for elevational control of the gun.

Fig. 3 is a circuit diagram of a control system according to the invention for lateral control of the gun.

Fig. 4 is a circuit diagram of the detector means included in the systems of Figs. 2 and 3.

Fig. 5 is a circuit diagram of a modification of the elevational control system of Fig. 2.

Fig. 6 is a circuit diagram of a modification of the lateral control system of Fig. 3.

Fig. 7 is a circuit diagram of the L-filter network of Fig. 5.

Fig. 8 is a graph showing the effect of the network of Fig. 7 upon the elevational movements of the gun.

Fig. 9 is a circuit diagram of the L-filter network of Fig. 6.

Fig. 10 is a graph showing an elevational movement of the bow as a function of time for the control system according to Fig. 5.

Fig. 11 is a graph showing the corresponding elevational movement of the gun as a function of time.

Fig. 12 is a graph showing a lateral movement of the bow as a function of time for control system according to Fig. 6.

Fig. 13 is a graph showing the corresponding lateral speed of the gun as a function of time.

Figs. 14 and 15 are graphs showing the actual lateral movements of the gun relative to the ideal movements when no filter network is present and as affected by the filter network of Fig. 9.

Fig. 17 is a circuit diagram of still another modification of the elevational control system of Fig. 5.

Fig. 18 is a circuit diagram of a modification of the lateral control system of Fig. 6.

Figure 1:
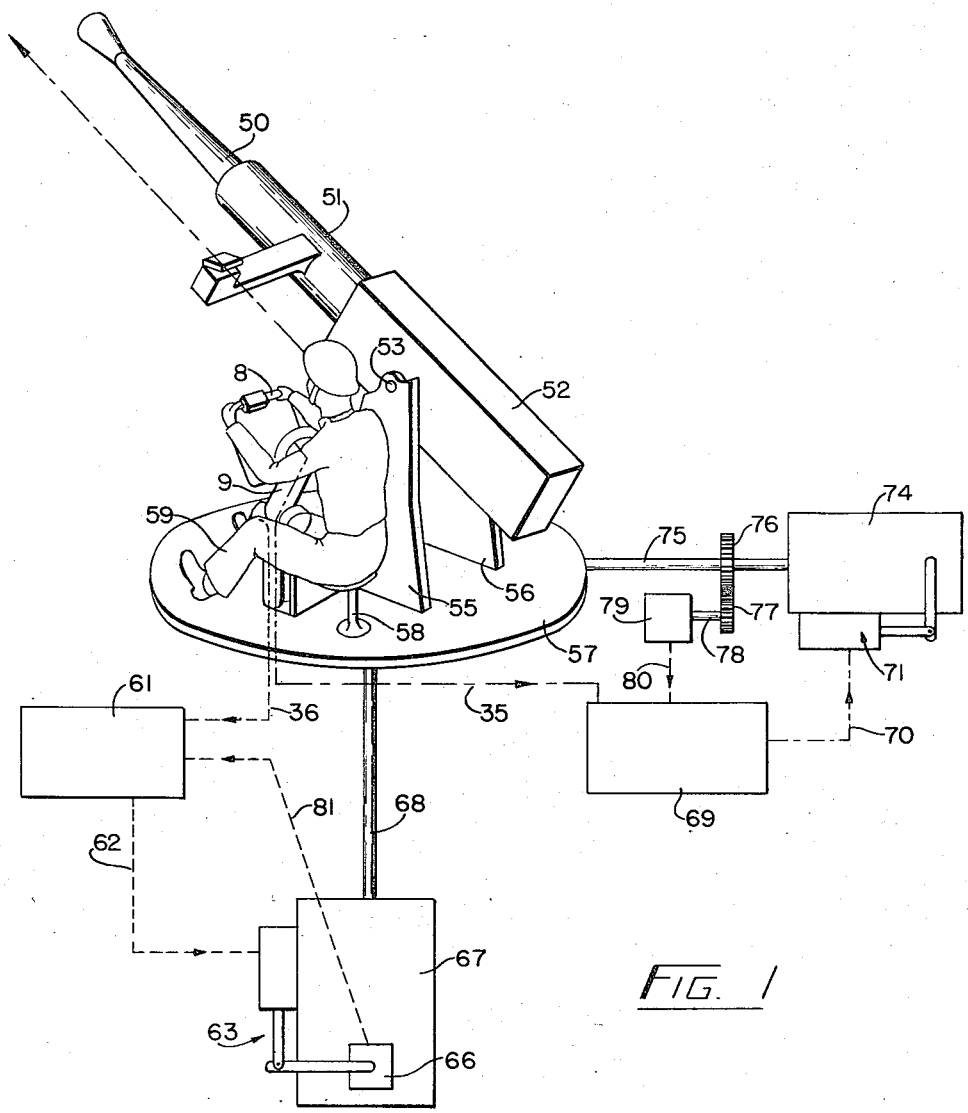
Fig. 1 is a diagrammatic view of a complete moving and control mechanism according to the invention for laterally and elevationally aiming a piece of ordnance including a gun.

Referring first in detail to Fig. 1, this figure shows a moving and control mechanism according to the invention for moving a gun in lateral and elevational direction. The gun is shown as comprising a barrel 50, a recoil jacket 51, and a breech casing unit 52. For the purpose of the elevational movement of the gun, casing 52 is provided with two trunnions 53 journalled in uprights or standards 55 and 56 respectively secured to a baseplate 57 which also supports a seat 58 for a gun pointer or layer 59. The seat is shown as a simple bucket seat but may be provided with a back rest. In front of the seat a control means including a control bow or joystick 8, is mounted. This control bow is rotatable relative to a column 9 about a vertical axis for lateral movement of the gun and also about a horizontal axis for elevational adjustment of the gun. A rotation of the control bow about either of its rotational axes serves to generate corresponding A.-C. signals as will be more fully explained hereinafter.

The A.-C. signals indicative of a rotation of the control bow about column 9 for lateral or azimuth adjustment of the gun are transmitted through a cable 36 to the input side of electronic control means 61 in which the received A.-C. signals are first amplified, then detected and finally fed to a frequency-transmission means as will also be more fully explained hereinafter. The output signals of the frequency-transmission means are supplied through a cable 62 to speed-regulating means 63 of reversible drive means 67. These drive means rotate through transmission means diagrammatically shown as a shaft 68 the base 57 and with it the gun in one or the other direction and with a speed as demanded by the strength or character of the signals supplied to the regulating means 63. The system further includes electric synchronizing means 66 the output of which is fed back to the control means 61 by a cable 81.

For purpose of the elevational control of the gun position, A.-C. signals indicative of the angular position of control bow 8 are fed through a cable 35 to the input side of electronic speed control means 69 in which similar to control means 61 the A.-C. signals are first amplified, then detected and finally through frequency-transmission means and a cable 70 fed to the input side of speed-regulating means of reversible drive means 74. These drive means, through transmission means diagrammatically shown as a shaft 75, serve to elevate or depress the gun. Shaft 75 supports thereon a gear 76 in mesh with a gear 77 on a shaft 78 of electric synchronizing means 79 the output of which is fed back by a cable 80 to the control means 69.

The angular movement of the gun, when elevated or depressed, is obviously controlled by the signals fed to the regulating means 71 and is directly proportional to the angular movements of control bow 8 so that the gun will always follow these movements.

The arrangement of control bow 8, column 9 and the electric components controlled by the movement of the bow about either of its axes is more fully described in co-pending application Ser. No. 207,969, filed on January 26, 1951, and now Patent No. 2,659,275, issued November 17, 1953.

Having briefly described the general organization of the gun moving and control mechanism the specific arrangements of the mechanism will now be described in detail.

Referring to Fig. 2 which shows the elevational moving mechanism the control system of this figure comprises the aforementioned control means 79 and a second similar control means 85. Both these control means are shown as synchronizing means each comprising a stator 86 and 87 respectively. The stators are supplied with alternating current from an A.-C. source 90 in form of an oscillating means generating a reference signal. The angular position of the rotor 88 is controlled by the angular position of control bow 8 and the angular position of rotor 89 by the elevational position of the gun. As will be observed, the two control means are connected in the manner of an A.-C. selsyn system so that the difference signals fed through cable 35 to control means 79 will be indicative of the differential position of the two rotors, the difference signal output becoming zero when the relative position becomes synchronized or, in other words, when the elevation of the gun corresponds to the angular position of the bow. The control means 69 to which the reference signals are fed comprise a conventional amplifying means 90 and a conventional frequency-transmission means 91 so that a detailed description of these means does not appear to be essential for the understanding of the invention. The circuit diagram of the detecting means 92, although also essentially conventional, is shown in Fig. 4. According to this figure, the output of the amplifier 90 is fed to the input side of detector 92 and through a transformer to the grids of two triodes 93 and 94, the plate circuits of which are connected by leads 95 and 96 to the A.-C. source 90. It will be apparent that when the input signals supplied to the grids have the same implitude and are in phase with the reference signal from source 90 the voltages at both output terminals 97 and 98 of the detector will be equal, and that when there is a difference in amplitude differential voltages will be obtained at the output terminals.

Figure 21:
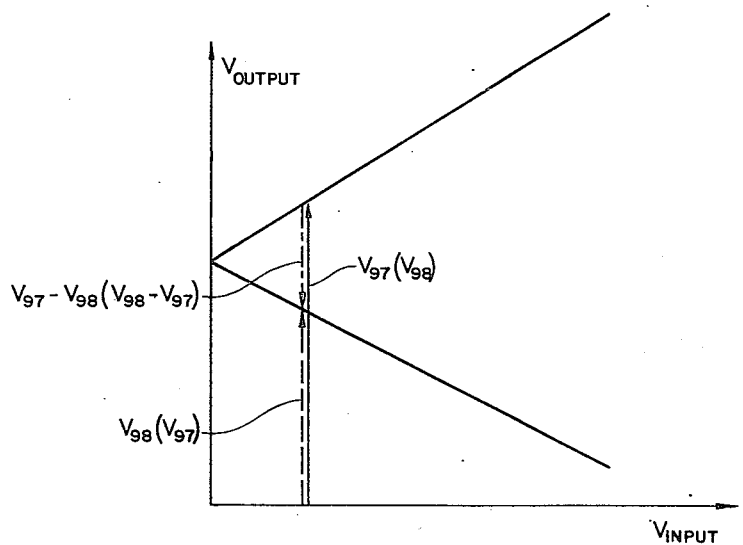
Fig. 21 is a graph of the changes in the voltage supplied to the detector means of Fig. 4.

The graph according to Fig. 21 shows the changes in voltage that occur at terminals 97 and 98 of Fig. 4 in response to different voltages supplied to the detecting means. As will appear from the graph, the voltage at terminal 97 follows the upper curve and the voltage at terminal 98 the lower curve. When now the input voltage shifts in phase the voltage at terminal 97 will follow the lower curve and the voltage at terminal 98 the upper curve. For further explanation, a voltmeter 99 is shown on Fig. 4 which measures the voltages between terminals 97 and 98 as represented by the two opposite arrows $V_{97}$ and $V_{98}$ in Fig. 21. There are also shown in Fig. 4 three different positions of the pointer of the voltmeter.

The signal output of the control means 69 is fed to control valve means 100 which may be visualized as a conventional electro-mechanical control valve. This valve directs oil or another suitable operating fluid supplied to the valve through a pipe 101 either through a pipe 102 or a pipe 103 depending upon the signal from the control means. Pipes 102 and 103 communicate with a hydraulic control device 104 including a plunger or servo-piston 105 which is displaced in one or the other direction depending upon the flow of oil through pipe 102 or 103. Control devices of this type are well known in the art. Plunger 105 is linked to a speed and direction control lever 106 of the reversible drive means 74. This drive means may be visualized as being of the variable speed type so arranged that they operate at a different speed for different settings of lever 106.

The operation of the mechanism according to Fig. 2 will be apparent from the previous description so that it suffices to state that the difference signals generated by the angular movements of the control bow and fed through conductors 35 to the control means 69 will cause the gun directly and continually to follow the movements of the control bow and to move through an elevational angle corresponding to the angular displacement of the control bow.

The moving and control mechanism for traversing the gun, as shown in Fig. 3, is similar in many respects to the elevational mechanism of Fig. 2. The same numerals are used to designate components corresponding to those shown in Figs. 1 and 2. The essential difference between the control systems of Figs. 2 and 3 is that according to Fig. 3 the angular position of the rotor 89 is not directly controlled by the position of the gun but by the speed of the gun or the position of control lever 106 which, in turn, is controlled by the signal output of the control means 61. The result of this arrangement is that the gun is not traversing in synchronism with the rotation of the control bow but may be caused to traverse with different speeds for different positions of the control bow. Thus, the difference signals being a function of the relative position of the control bow and the position of lever 106 can move lever 106 into positions causing rates of speed of the drive means corresponding to positions of the control bow as previously explained. As a result, the gun may move through a much larger lateral angle than is the angle through which the control bow has been rotated. This facilitates it for the gun pointer to follow the aforementioned rapid movements of the target in a lateral plane.

The elevational moving and control mechanism of Fig. 5 is similar to that of Fig. 2 and includes all components shown in this figure. In addition, the mechanism of Fig. 5 includes electric control means automatically compensating for undesired movements of the gun thereby facilitating the tracking of airplane or other fast moving target. These means are shown in Fig. 5 and in the detail Fig. 7 as a filter network, more specifically as an L-filter network generally designated by 110. This network may be structurally combined with control means 69' which correspond in function to the control means 69 of Fig. 2. The control means 69' are shown as comprising two amplifying and detecting means 111 and 112, means 116 generating difference signals and receiving the output signals of means 111 and 112, and frequency-transmission means 91. The detecting means may be designed as shown in Fig. 4, the amplifying means being conventional.

The network 110 comprises in this series branch a resistance means 113 and in its parallel branch a resistance means 114 connected in series with a capacitance means 115. The two resistance means and the capacitance means may either be dimensioned in accordance with the specific requirements of an application, or some or all of the components of the network may be variable.

Let it be first assumed that the control bow and the gun are in synchronized positions, then obviously no A. C. signal indicative of an error in the relative position of the bow and the gun is generated by rotors 88 and 89. Consequently, capacitor 115 is not charged and acts as a short-circuiting component and the resistors 113 and 114 act as a voltage divider. When now the control bow is tilted relative to the gun and a corresponding error signal is generated the capacitor becomes charged. As a result, the branch of the network including resistors 114 and capacitor 115 can be regarded as non-existing. The network of Fig. 7 will always be at a potential and the short-circuiting effect of capacitor 115 will occur when the voltages change (see Fig. 21).

The effect of the network upon the elevational aiming of the gun can be best understood from the graph of Fig. 8. In this graph, the ordinate represents the turning angle $\alpha$ of the gun and the abscissa the time factor. The dashed curve 117 symbolizes the ideal movement of the gun; the curve 118 shows the actual movements of the gun by reason of the presence of the network when an error signal is generated; and the curve 119 shows the actual movements of the gun when resistor 114 is short-circuited by capacitor 115.

Let it first be assumed that the network of Fig. 7 be omitted, then as explained in connection with Fig. 2 each variation in the angular position of the control bow results in an instant corresponding follow movement of the gun. If now the network according to Fig. 7 be provided, then the gun during a movement of the control bow will not move in synchronism with the bow but will lag relative thereto. This lag is determined by the charging time of capacitor 115 and the voltage dividing effect of resistors 113 and 114. This lag of the gun movement which of course consumes only a very short period of time is proportional to the elevational moving speed of the gun and may be defined as "speed proportional lag."

Fig. 10 shows an example of a movement of the control bow as a function of time and Fig. 11 in full lines the corresponding movement of the gun as a function of time. Fig. 11 also shows in dotted lines the movement of the gun if the filter network 110 where not present. The difference between the two curves of Fig. 11 clearly indicates the time lag in the gun movement compensating for an undesired movement caused by the gun pointer.

The lateral moving and control mechanism of Fig. 6 is similar to Fig. 3 and corresponding components of Fig. 6 are designated by the same numerals. The control means 61' of Fig. 6 is similar to the means 69' of Fig. 5 and is associated with a L-filter network generally designated by 120 and preferably structurally combined with control means 61'. The L-filter network 120 best shown on Fig. 9 comprises in its series branch a resistance means 121 and capacitance means 122 connected in parallel with the resistance means. The parallel branch of the network includes a resistance means 123. The two resistance means and the capacitance means may again either be dimensioned in accordance with the specific requirements of an application or some or all of the components of the network may be variable.

As will be apparent from the previous specification, no error signal is generated by the selsyn system formed by the control means 66 and 85 when the gun traverses with a speed corresponding to a certain position of the control bow about its vertical axis. If now the pointer wants to change the speed of the gun he rotates the control bow about column 9 into a new position. This movement of the control bow is shown in Fig. 12 as a function of time. The speed of the gun does now no longer correspond to the position of the bow and an error signal is generated and fed to network 120. In this network the two resistors 121 and 123 act as a voltage divider but in as much as the capacitor is not charged until an error signal is generated the capacitor short-circuits resistor 122. Consequently, the initial voltage at the output terminals of the network is very high for a short period of time until the capacitor is charged and the two resistors of the network begin to act as a voltage divider so that the output voltage of the network drops. It will be apparent that the output voltage of the network changes the position of lever 106 and hence the speed of the gun. In other words, the changes in speed of the gun is a function of the output voltage of network 120. Fig. 13 shows the output voltage of the network, or expressed differently the speed of the gun as a function of time.

The effect of network 120 upon the aiming of a gun will best be understood from the graphs of Figs. 14 and 15. Before describing these graphs in detail, it should be mentioned that if the gun pointer turns the control bow into a new position, the gun does not immediately pick up the new speed but makes first a brief jerky movement and then begins to traverse with the new speed (see Fig. 13). In other words, the gun will traverse with a certain speed as the gun pointer turns the bow, then make a further turn with a high speed when the pointer turns the bow into a new position, and finally continues to turn with a new speed according to the new adjustment of the control bow, said new speed being lower than the high intermediate speed. The angle through which the gun turns during said period of high speed is hereinafter sometimes called "increment of distance." The aforementioned jerk in the gun movement is caused by the effect of the filter network according to Figs. 6 and 9 upon the entire moving system of Fig. 6.

Referring now to the graph of Figs. 14 and 15 in detail, the ordinate of each graph represents the lateral turning angle $\alpha$ of the gun and the abscissa the time factor. The dotted curve 125 of each graph indicates the ideal lateral movement of the gun. The two solid curves generally designated by 126 and 127, of Figs. 14 and 15 respectively illustrate the effect of the absence of a network and of network 120 and exemplify the movements of the gun when the gun pointer attempts to cause the gun barrel to follow the ideal curve 125 as closely as possible. It may be assumed that curve 127 is obtained when the components of the network have certain values calculated or adjusted for a specific application.

An analysis of curve 126 shows that this curve comprises three sections 128, 129 and 130 which represent different speeds of the gun. The point A on curve section 130 indicates the momentary position of the gun in which the gun pointer realizes that the actual speed of the gun is different from the speed the gun should have to follow the ideal curve 125, and point B the position at which he adjusts his control bow for another speed of the gun for the purpose of reducing the difference between the actual position of the gun and the ideal position thereof. The time interval between the two points A and B represents the mental reaction time of the gun pointer. As a result of the last mentioned adjustment, the gun now travels along a path represented by curve section 129. As Fig. 14 shows, the last adjustment of the gun speed has resulted in an over-compensation of the gun speed. Hence, the gun pointer again adjusts his control bow and the path of the gun is now represented by curve section 130. In other words, the gun will hunt or oscillate about the ideal curve 125 representing the desired movement of the gun or, in other words, the movement of the target.

According to Fig. 15, curve 127 is also composed of three sections 131, 132 and 133 representing different speeds of the gun, section 132 illustrating the increment of distance. The time interval between the points A and B again represents the mental reaction time of the gun pointer. The curve according to Fig. 15 also shows that when the gun pointer adjusts his control bow at the point B, the gun will move from point B to C and then continue with a speed represented by curve section 133. The curve section 132 represents the aforementioned increment of distance.

Figure 16:
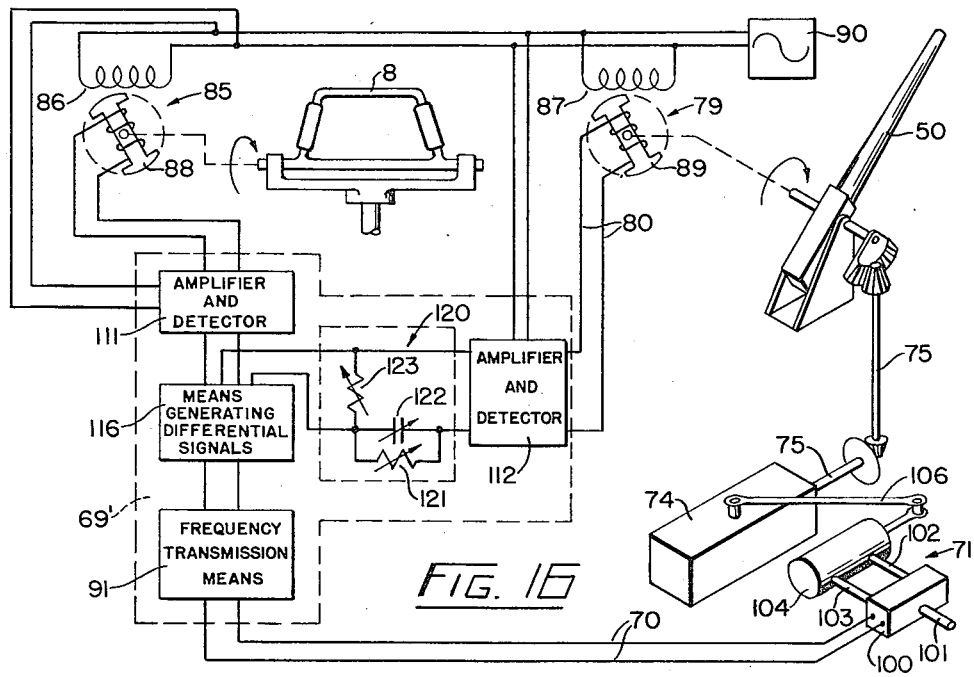
Fig. 16 is a circuit diagram of a modification of the elevational control system of Fig. 5.

Fig. 16 shows a moving and control mechanism for an elevational movement of the gun which is generally similar to the mechanism of Fig. 5, corresponding components being designated by same numerals. The system of Fig. 16 is distinguished from the system of Fig. 5 by providing an L-filter network 120 as described in connection with Figs. 6 and 9. As a result, elevational gun movements are obtained in accordance with graph 8. It should further be observed that in Fig. 16 the filter network is fed with the output signals of amplifying and detecting means 112 connected to rotor 89 which is directly controlled by the elevational position of the gun.

The moving and control mechanism of Fig. 17 includes all the components of the control system of Fig. 5. In addition, there is provided a third synchronizing control means 140 having a stator 141 connected to the A. C. source 90 generating the reference signal and a rotor 142, the rotational position of which relative to stator 141 is controlled by the position of control lever 106 as is described in connection with Fig. 6. The output signals of rotor 142 are fed to an amplifying and detecting means 143 of the type previously described. The signals are then passed through an L-filter network 110 and fed to a conventional mixing network 144 in which the output signals of the selsyn system formed by control means 79 and 85 are mixed with the signals supplied by control means 140.

The operation of the system of Fig. 17 will be generally apparent from the previous description. It suffices to state that if control means 140 and network 110 connected therewith were omitted the system of Fig. 17 would operate in the same manner as the system of Fig. 2, that is, the gun would always move in synchronism with the control bow. The presence of the filter network will cause a lag in the gun movement as described in connection with Fig. 5, thereby compensating for an undesired movement of the gun caused by the gun pointer.

Fig. 18 shows a moving and control mechanism for traversing the gun which is basically similar to the mechanism of Fig. 6. The only essential difference is that an L-filter network 110 is included in the system and connected for control by the output signals of rotor 142. This rotor, in turn, is controlled by the position of control lever 106 in the same manner as has been described in connection with Fig. 17.

The operation of the system of Fig. 18 will produce the same results as the operation of the system of Fig. 5.

Figure 19:
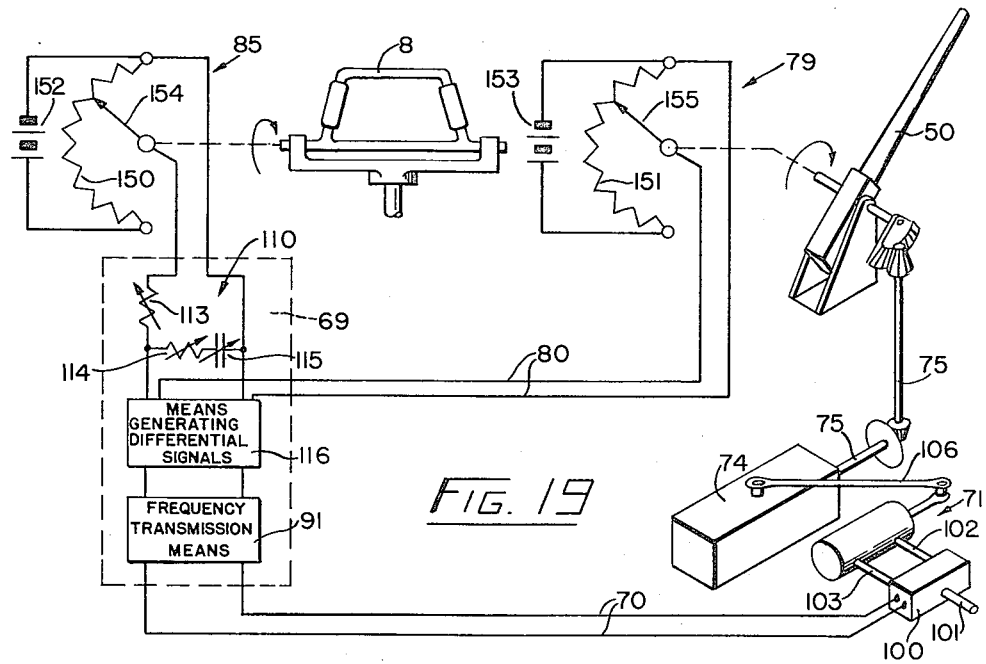
Fig. 19 is a circuit diagram of still another modification of the elevational control system of Fig. 5.

The elevational system of Fig. 19 is basically similar to the system of Fig. 5. The principal purpose of Fig. 19 is to show that the arrangement of control means 85 and 86 is not limited to synchronism means including a stator and a rotor but may take, for instance, the form of potentiometer means. These latter means are shown as comprising resistance means 150 and 151 respectively connected to a D.-C. source 152 and 153 respectively. The movable contacts 154 and 155 respectively of the potentiometer are controlled by the relative movements of the control bow and the gun respectively. The difference signals supplied by the potentiometers are again used to control the elevational gun movements as previously described. The effect of the filter network 110 is also as previously described.

Figure 20:
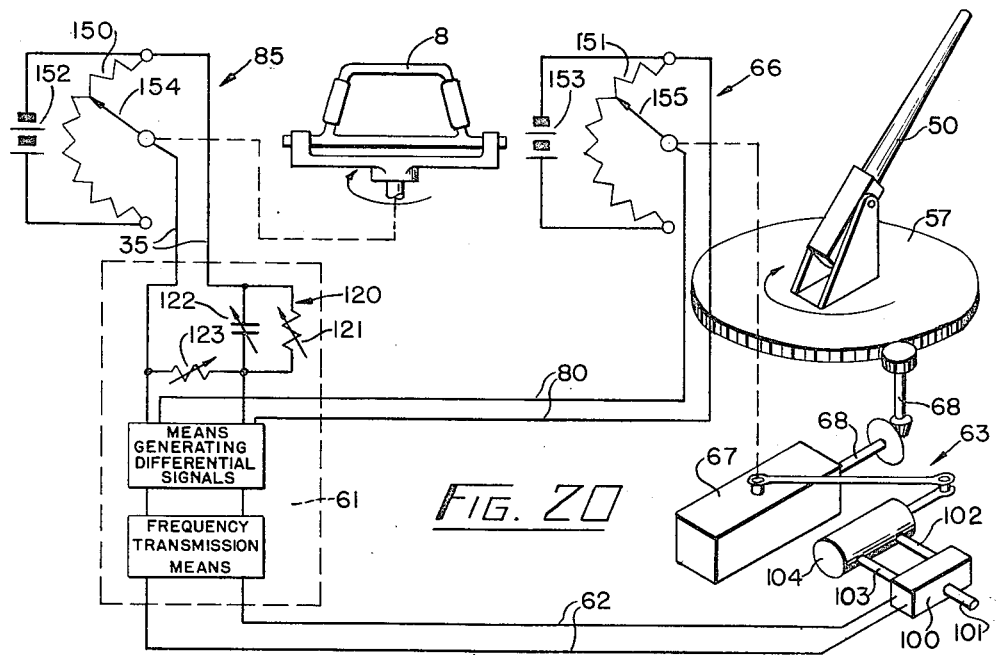
Fig. 20 is a circuit diagram of still another modification of the lateral control system of Fig. 6.

The traversing system of Fig. 20 is similar in principle to the system of Fig. 6 and shows also the use of potentiometers as control means 85 and 66 respectively.

The operation of the system according to Fig. 20 will be evident from the description of Fig. 6.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A gun moving and control mechanism for tracking a target moving in a lateral and vertical plane, the said mechanism comprising electrically controlled, reversible first drive means for rotating the gun in elevational direction, electrically controlled, reversible second drive means for traversing the gun, movable control means operable by a gun pointer for controlling the gun movements in elevational and lateral directions by actuation of said control means, first follow-up circuit means connected in circuit with the first drive means for transmitting elevational control movements of the control means to the first drive means, and second follow-up circuit means connected in circuit with the second drive means for transmitting lateral control movements of the control means to the second drive means, the said first follow-up means causing elevational follow-up movements of the gun in synchronism with respective adjustments of the control means, and the said second follow-up means imparting to the gun a predetermined traversing speed for each position of the control means, the said predetermined traversing speeds being different for different positions of the control means.

2. A gun moving and control mechanism for tracking a target moving in a lateral and vertical plane, the said mechanism comprising first electrically controlled, reversible and variable speed drive means for rotating the gun in elevational direction, second electrically controlled, reversible and variable speed drive means for rotating the gun in lateral direction, first speed regulating means controlling the speed and direction of the first drive means, second speed regulating means controlling the speed and direction of the second drive means, movable control means operable by a gun pointer for controlling the gun movements in elevational and lateral directions by actuation of said control means, first follow-up circuit means connected in circuit with the first regulating means for transmitting elevational control movements of the control means to the said first regulating means, and second follow-up circuit means connected in circuit with the second regulating means for transmitting lateral control movements of the control means to the said second regulating means, the said first follow-up means comprising a signal generating component controlled by the elevational adjustment of the control means and a signal generating component controlled by the elevational position of the gun, the difference signals generated by said components being fed to the first regulating means for control of the same and becoming zero when the elevational positions of the control means and the gun are in angular synchroism with each other, and the said second follow-up means comprising a signal generating component controlled by the lateral adjustment of the control means and a signal generating component controlled by the setting of the second speed regulating means, the difference signals generated by the said two latter components being fed to the second regulating means for controlling the setting of the second regulating means so as to move the latter into a position as demanded by said difference signals, the said position being independent of the momentary lateral position of the gun relative to the lateral adjustment of the control means.

3. In an electric control system for aiming a gun in a lateral plane in response to a positioning of actuating means in one direction and in a vertical plane in response to a positioning of the said actuating means in another direction, in combination first electric control means varying the rate of the lateral gun movement in response to a positioning of the actuating means in the direction for lateral movement of the gun, and second electric control means varying the elevational follow-up movement of the gun in response and relative to a positioning of the actuating means in the direction for elevational movement of the gun so as to impart a lag to the elevational follow-up movement of the gun relative to the position of the actuating means.

4. In an electric control system for aiming a gun in a lateral plane in response to an operation of actuating means in one direction and in a vertical plane in response to an operation of the said actuating means in another direction, in combination a traversing mechanism for moving the gun in the lateral plane electrically connected with the actuating means for control thereby, an elevating mechanism for moving the gun in the vertical plane electrically connected with the actuating means for control thereby, a first filter network comprising capacitance and resistance means included in the circuit connections between the actuating means and the traversing mechanism, said network being arranged to impart an increment of distance to the movement of the gun in response to an operation of the actuating means for lateral movement of the gun, and a second filter network comprising capacitance and resistance means included in the circuit connections between the actuating means and the elevating mechanism, said latter network producing a lag in the elevational follow-up movement of the gun in response to an operation of the actuating means for vertical movement of the gun.

5. In an electric control system for aiming a gun in a lateral plane in response to an operation of actuating means in one direction and in a vertical plane in response to an operation of the actuating means in another direction, in combination a traversing mechanism for moving the gun in the lateral plane electrically connected with the actuating means for control thereby, an elevating mechanism for moving the gun in the vertical plane electrically connected with the actuating means for control thereby, a first filter network comprising capacitance and resistance means included in the circuit connections between the actuating means and the traversing mechanism, said network being arranged to superpose a temporary increment of distance to the speed of the lateral movement of the gun in response to an operation of the actuating means for lateral movement of the gun, and a second filter network comprising capacitance means included in the circuit connections between the actuating means and the elevating mechanism, said second network being arranged to affect a temporary time lag in the elevational follow-up movement of the gun in response to an operation of the actuating means for vertical movement of the gun.

6. An electric control system as defined in claim 5, wherein the said temporary time lag controlled by the second network is proportional to the rate of the elevational movement of the gun.

7. An electric control system as defined in claim 4, wherein the said first network comprises an L-filter network including in its series branch resistance means and capacitance means connected in parallel and in its parallel branch resistance means.

8. An electric control system as defined in claim 7, when at least one of the components of the said first network is variable.

9. An electric control system as defined in claim 4, wherein the said second network comprises an L-filter network including in its series branch resistance means and in its parallel branch capacitance means.

10. An electric control system as defined in claim 9, wherein said parallel branch additionally includes resistance means connected in series with the capacitance means.

11. An electric control system as defined in claim 10, wherein at least one of the components of the second network is variable.

12. A gun moving and control mechanism as defined in claim 2, in combination with electric control means included in the circuit connections between the first follow-up circuit means and the first speed regulating means and arranged to vary the rate of the elevational follow-up movement of the gun independently of the rate of movement for which the said first regulating means are adjusted in response to an elevational adjustment of the control means.

13. A gun moving and control mechanism as defined in claim 12, wherein the said electric control means comprise a filter network including capacitance and resistance means connected to the circuit connections between the first follow-up means and the first regulating means, the said network producing a lag in the elevational follow-up movement of the gun in response to an operation of the control means for elevational movement of the gun.

14. A gun moving and control mechanism as defined in claim 2, in combination with electric control means included in the circuit connections between the second follow-up circuit means and the second speed regulating means and arranged to vary the rate of the lateral gun movement independently of the rate of movement for which the said second regulating means are adjusting in response to a lateral adjustment of the control means.

15. A gun moving and control mechanism as defined in claim 14, wherein the said electric control means comprise a filter network including capacitance and resistance means connected to the circuit connections between the second follow-up means and the second regulating means, the said network being arranged to impart an increment of distance to the movement of the gun in response to an operation of the control means for lateral movement of the gun.

16. A gun moving and control mechanism as defined in claim 2, in combination with an additional signal generating component controlled by the adjustment of the first speed regulating means and connected in circuit with the first follow-up circuit means so as to generate difference signals with the signals generated by the signal generating components of said follow-up circuit means, and filter network means included in the circuit connections between the said additional signal generating component and the first follow-up circuit means, the said filter network producing a lag in the elevational adjustment of the control means.

References Cited in the file of this patent

UNITED STATES PATENTS

| | | |
|---|---|---|
| 2,401,168 | Kronenberger | May 28, 1946 |
| 2,496,391 | Hall | Feb. 7, 1950 |
| 2,509,446 | Oplinger et al. | May 30, 1950 |
| 2,553,786 | Redemske | May 22, 1951 |
| 2,628,535 | Terwilliger et al. | Feb. 17, 1953 |